Aug. 6, 1929.   D. M. BELCHER   1,723,399
VALVE OPERATING DEVICE
Filed Aug. 20, 1924
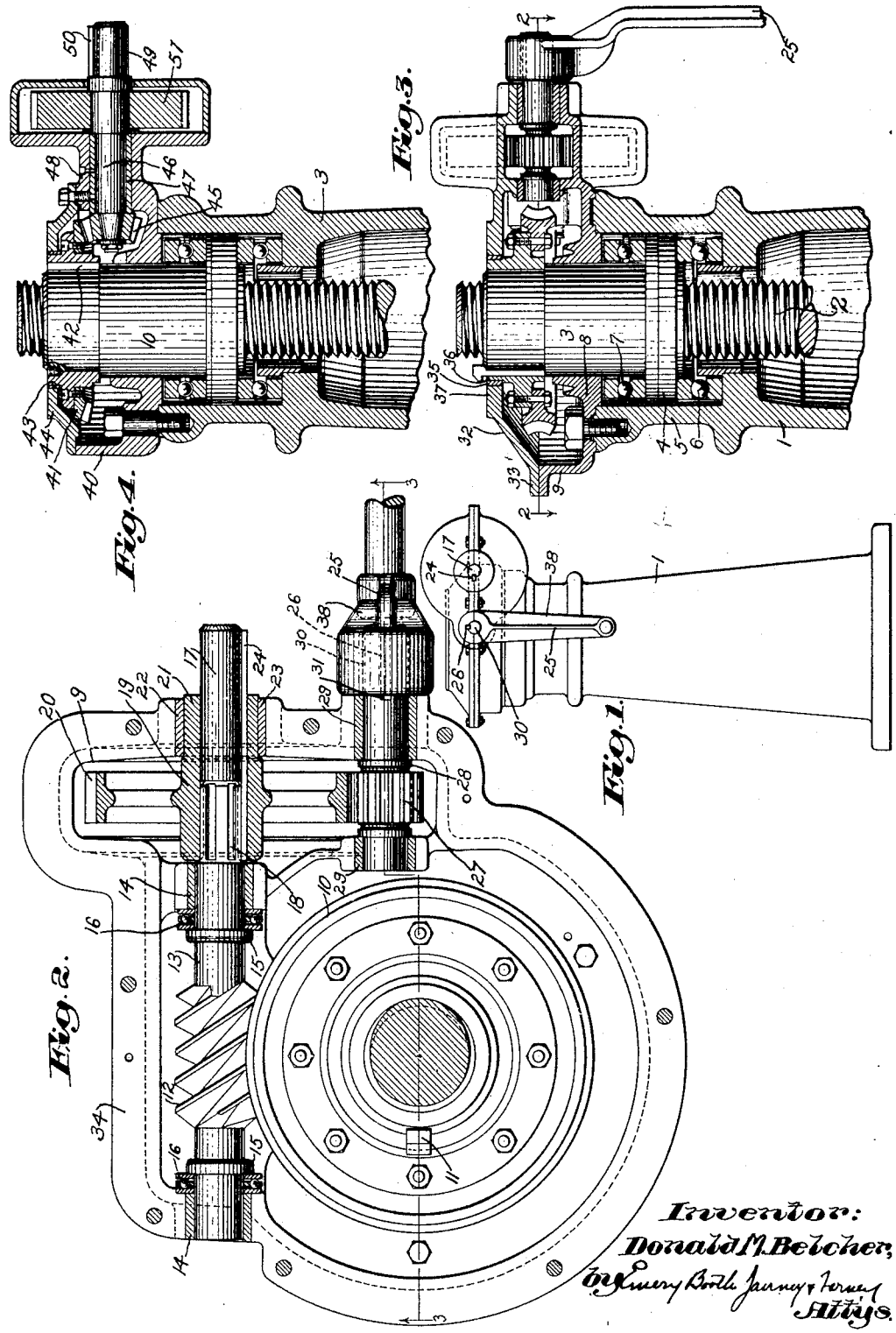

Patented Aug. 6, 1929.

1,723,399

UNITED STATES PATENT OFFICE.

DONALD M. BELCHER, OF WINCHESTER, MASSACHUSETTS, ASSIGNOR TO COFFIN VALVE COMPANY, OF NEPONSET, MASSACHUSETTS, A CORPORATION OF MAINE.

VALVE-OPERATING DEVICE.

Application filed August 20, 1924. Serial No. 733,098.

This invention relates to valve operating devices and has for its object to provide simple, efficient and powerful means primarily for effecting the manual operation of relatively large gate, sluiceway or other valves at predetermined speed or power consistent with the work to be accomplished.

In the accompanying drawings wherein I have shown merely for illustrative purposes certain embodiments of my invention:

Fig. 1 is a front elevation of the preferred form of stand;

Fig. 2 is a plan section taken on the line 2—2 of Fig. 3, certain parts of the device being shown in elevation;

Fig. 3 is a vertical section, partly in elevation, of the gate valve stand and a portion of a valve stem, also instrumentalities for operating the latter; and Fig. 4 is a detail section, partly in elevation, of a stand embodying a modified form of gearing.

In carrying out my invention I preferably employ a hollow stand 1 of appropriate and pleasing design to which may be attached the body of a valve such for example as a gate, sluiceway or other valve of large dimensions. The valve body being of well known form and constituting no part of the invention is omitted from the drawings. Arranged within said standard to move therein when the valve proper is opened or closed is a valve stem 2 in the present example consisting of a screw-threaded shaft having axial movements and, being attached to the movable member of the valve in the usual manner, rotation thereof is prevented.

Desirably the stand 1 is of a height most convenient for the manual operation of the valve and furthermore the upper portion of the stand is preferably enclosed so as to permit the operating parts to be run in oil. Included in said parts is a rotary member, herein a nut 3 screw-threaded internally to engage the screw threads of the shaft 2 and provided with an annular flange 4 near its lower end which substantially fits a cylindrical bore 5 of the stand and rests and operates upon an appropriate anti-friction bearing 6 adapted to resist the downward thrust of said nut. A similar bearing 7 engages the upper face of said flange 4 and receives the upward thrust of said nut preventing axial movement of said nut and thereby insuring the proper axial movement of said screw.

The cylindrical bore 5 of the stand is preferably of sufficient length to contain the two bearings 6 and 7 and the flange 4, the upper bearing 7 being retained in proper location by a partition 8 forming the bottom of a removable hollow top 9 adapted to enclose the operating means for said nut and constituting a part of the oil containing chamber of the stand.

The gate to which the stem 2 is attached is very often of great weight and the pressure of fluid thereagainst is such as to require considerable more power to operate them at one time than at another and naturally these pressures vary with the size of the valve and also with the head of water controlled thereby. In other words there are times when the application of pressure directly upon the nut to rotate the same may be sufficient to raise or lower the gate of the valve attached to said stem 2 but there are other times when a great reduction in speed and a consequent increase in power is necessary in order to effect such movements.

Various devices may be employed for increasing or diminishing the power or ratio of the operating means but preferably means are provided whereby the operating element, such for example as a hand crank, may be applied at one of a number of operating points involving a different ratio of gearing so that, without more than shifting said operating element from one of said connections to another, the required speed and power may be obtained. For convenience I have provided for accomplishing the aforesaid purposes a worm gear 10 of a type similar to that used in the transmission of motor vehicles being relatively small and of high grade materials capable of withstanding severe strains and also of compact construction so as to occupy a very small amount of space, thus permitting the same to be completely enclosed and operating continually in oil as previously stated.

Meshing with the worm wheel 10 which is herein shown keyed at 11 to the nut 3, is a worm 12 secured to a shaft 13 journalled in suitable bearings 14, 14 formed in the upper portion 9 of said stand, said shaft having collars or flanges 15 on opposite sides of said worm and engageable with end thrust bearings 16 to prevent axial movement of said worm.

Obviously the shaft 13 may be extended so as to protrude from the casing 9 and have operating means attached thereto whereby it may be directly rotated to impart movement to the screw 2 but in the present example I preferably provide an extension shaft 17 which is coupled, in any suitable manner to the shaft 13 at 18, herein within the hub 19 of a spur gear 20. The shaft 17 is appropriately supported in a portion of the housing 9 as, for example, through an extension 21 of said hub 19 which is journalled at 22 in an appropriate bearing 23.

The shaft 17 is extended through said bearing 23 so as to protrude a substantial distance therebeyond and has a key 24 extending substantially the length of said shaft and having engagement with a slot in said hub 19 and said shaft, thus causing the two to operate in unison. An operating member, herein a crank 25, is adapted to fit the protruding end of said shaft 17 and has a keyway 26 to receive the key 24 of said shaft, whereupon rotation of said crank will impart a like movement to the shaft and through the shaft 13, to the worm 12, worm gear 10 and nut 3, the speed of the latter being reduced and its power increased according to the ratio of the worm 12 to said gear 10.

Other reducing devices may also be provided and herein I have shown in connection with the gear 20, a pinion 27 secured to a shaft 28 journalled in bearings 29, 29 in said housing 9, said shaft 28 also having a protruding end 30 provided with a key 31 adapted also to fit the keyway 26 of the hand operating member 25 so as to effect rotation of the shaft 28 and thereby, through the pinion 27, screw 20, worm 12, and worm gear 10, impart a still slower but more powerful movement to said nut 3 than would be possible with the operating member 25 connected directly with the shaft 17. To provide for greater strength the bearings 14 and 22 for the shafts 13 and 17 respectively are placed close to opposite faces of the gear 20 and likewise the bearings 29, 29 of said shaft 28 are placed close up to the opposite faces of the pinion 27, said bearings being formed in part in the housing 9 and in part in a cover plate 32.

The cover 32 is provided with a marginal flange 33 adapted to engage a similar marginal flange 34 in the member 9, bolts being provided for extending through both flanges and thus tightly and securely fastening the said parts together.

In addition to the bearings 6 and 7 of said nut the upper end of said nut is arranged to be guided herein by a replaceable bearing ring 35 interposed between the end of the hub 36 of said gear 10 and a portion 37 of the cover plate 22 surrounding said gear hub. The portion 9 of said gear housing is, as previously stated, readily removable and may thereby be replaced by others designed to contain gears of different proportions for the changing of the speed ratios of the train of gears through which motion is imparted from the operating means to the nut 3 and furthermore the ratio of the gears on the shafts 17 and 28 may be supplemented by gears of larger or smaller diameters without replacing the present section 9. The entire standard construction is such as to readily permit changes in said ratio without necessitating the replacing of the entire stand but only the moving parts thereof or the immediate portions of the stand supporting said parts. Any replacing of parts, however small, does require more or less work and occupies considerable time and the necessity of this has been greatly reduced by providing the said extensions on the shafts 17 and 28 and permitting the operating handle 25 to be shifted from one to the other, said operating handle being offset at 38 to permit the hub of said operating member to be placed upon either one of said shafts and rotated without interfering with the other shaft.

From the foregoing description it will be clearly apparent that an operating device for valves is provided that may be operated at different speeds and transmit different powers with but little or no adjustment of the device ranging from extremely high power to relatively low power and from slow speed to high speed.

It is also within the scope and purpose of the invention to still further reduce the power of the device by substituting other forms of gearing in place of the worm gears employed such, for example, as I have shown in the modified form of Fig. 4 which comprises a housing 40 to take the place of the housing 9 upon the standard 3 and to contain a bevel gear 41 which is attached directly to the end of the nut 10 and secured to rotate therewith by a key 42. The gear 41 also includes a removable anti-friction ring 43 which engages a cylindrical portion 44 of the cover for said housing 40. A pinion 45 is arranged to mesh with the gear 41 and is secured to a shaft 46 journalled at 47 in an appropriate bearing 48 in said housing 40. The shaft 46 is extended so as to protrude from the said housing at 49 and is provided with a key 50 to fit the key slot 26 of the operating handle 25 shown in Figs. 1 and 2.

As in the form shown in Figs. 1 and 2 the shaft 46 may be provided with a spur gear 51 which, in turn, may be operated by appropriately proportioned driving pinions from a counter shaft similar to the shaft 28 of Fig. 2, thus providing a plurality of operating spindles or shafts with a corresponding range of variation in ratio of operating gears.

Although I have shown and described certain specific applications for working my invention it is to be distinctly understood that the invention is not limited to the construction herein shown but should be construed as broadly as the appended claims will allow.

Claims:

1. In a device of the character described, in combination, a stand, a valve stem operable within said stand, a nut operatively connected with said stem and journalled to rotate in said stand, a removable housing section for said stand, means enclosed within the said removable housing section for operating said stem at different speeds, including a driven gear for operating said nut, a bearing ring on said gear adapted to rotatably engage a portion of said housing, reduction gearing adapted to transmit motion to said driven gear and said nut and operating means for said reduction gearing adapted to connect with said train of gears at one of a plurality of points to effect the operation of said stem at different speeds.

2. In combination, a stand, a screw-threaded valve stem movable through said stand, a nut rotatably arranged in said stand in engagement with said stem, a train of gears for rotating said nut, and a two-part casing separated approximately in the plane of the axis of one of said gears for enclosing said gearing, said casing being removably supported upon said stand.

3. In combination, a stand, a valve stem movable in said stand, an operating member for said stem rotatable in said stand, a driven gear secured to rotate with said stem operating member, a train of reducing gears operable at at least one point of reduction to impart movement to said stem operating member, a casing for enclosing said train of gears detachably supported on said stand to facilitate the substitution of a train of gears of a different ratio, and a removable cover for said casing, said cover being removable from said casing in a plane approximately containing the axes of said reducing gears.

4. In combination, a stand having a bearing chamber at its upper end, bearings in said chamber, a screw-threaded valve stem movable through said bearing chamber, a rotatable nut arranged to rotate in said bearings, a train of reducing gears for operating said nut including a plurality of shafts arranged with their axes lying in a common horizontal plane, and an oil-tight casing for enclosing said train of gears and removably supported upon said stand, said oil-tight casing being formed in two parts separable in the plane of the axes of said shaft to permit substitution of the elements of said gear train.

5. In a valve mechanism, in combination, a valve stand provided with a bearing chamber, a screw-threaded stem movable through said chamber, a nut arranged in said chamber in operative relation to said stem, a train of gears for operating said nut including a plurality of shafts and means for enclosing said train of gears and for containing oil within which said gears are arranged to run, said gear enclosing means being separable in the plane of the axes of said gears to permit removal of said gears and the substitution therefor of a set of gears of different ratio without disturbing the other elements of said mechanism.

In testimony whereof, I have signed my name to this specification.

DONALD M. BELCHER.